Inventors.
James B. Black.
Wilbur F. Shurts.
By John W Darley
Attorney.

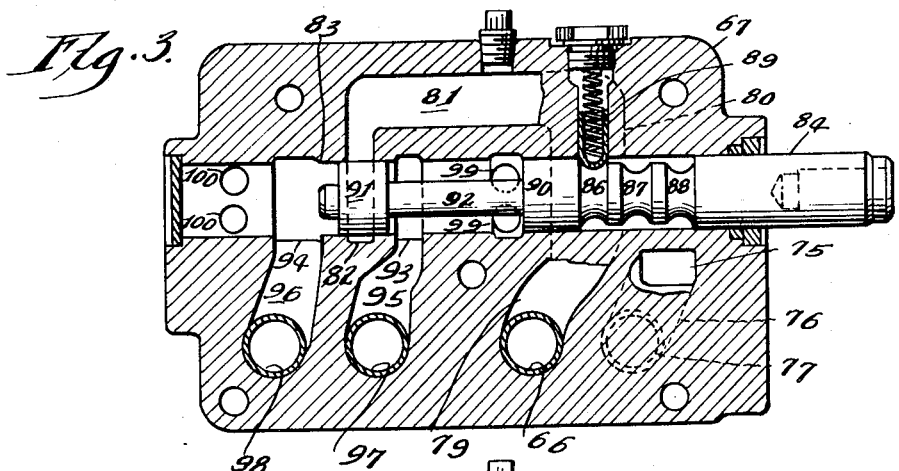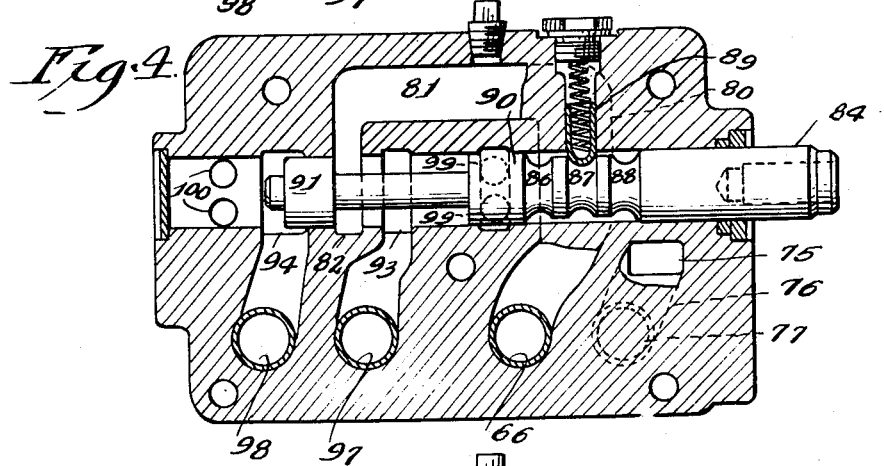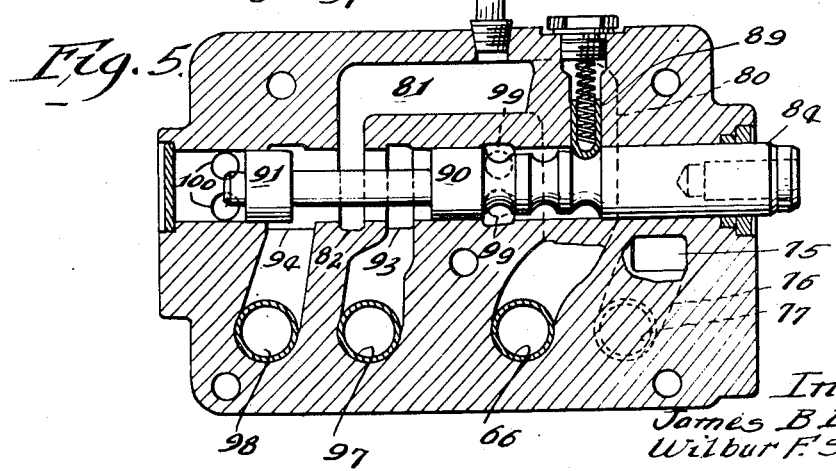

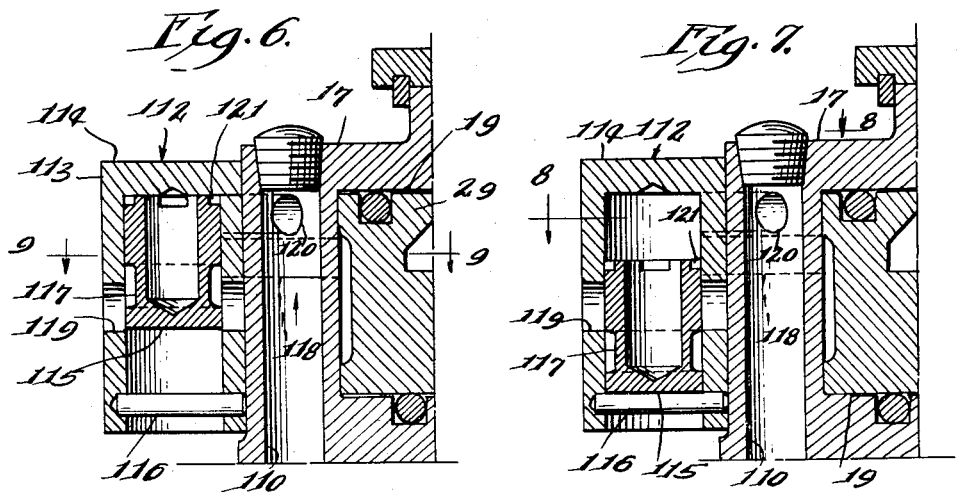
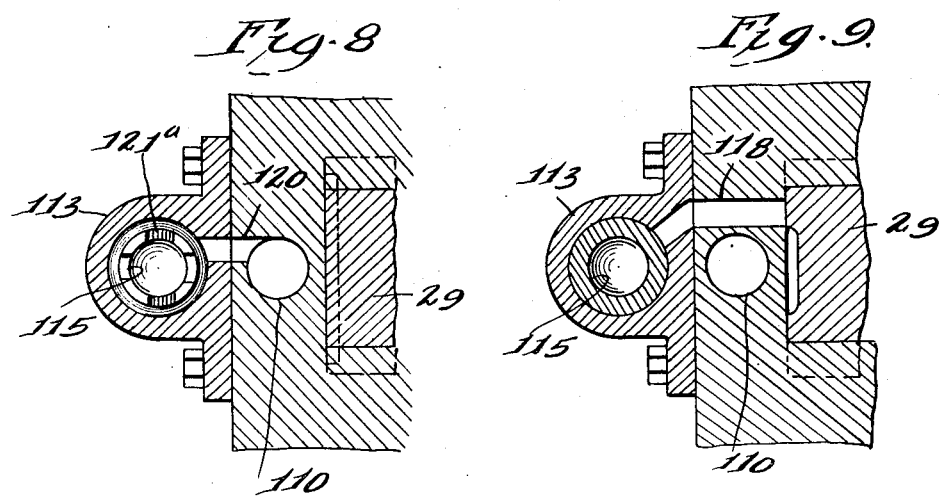

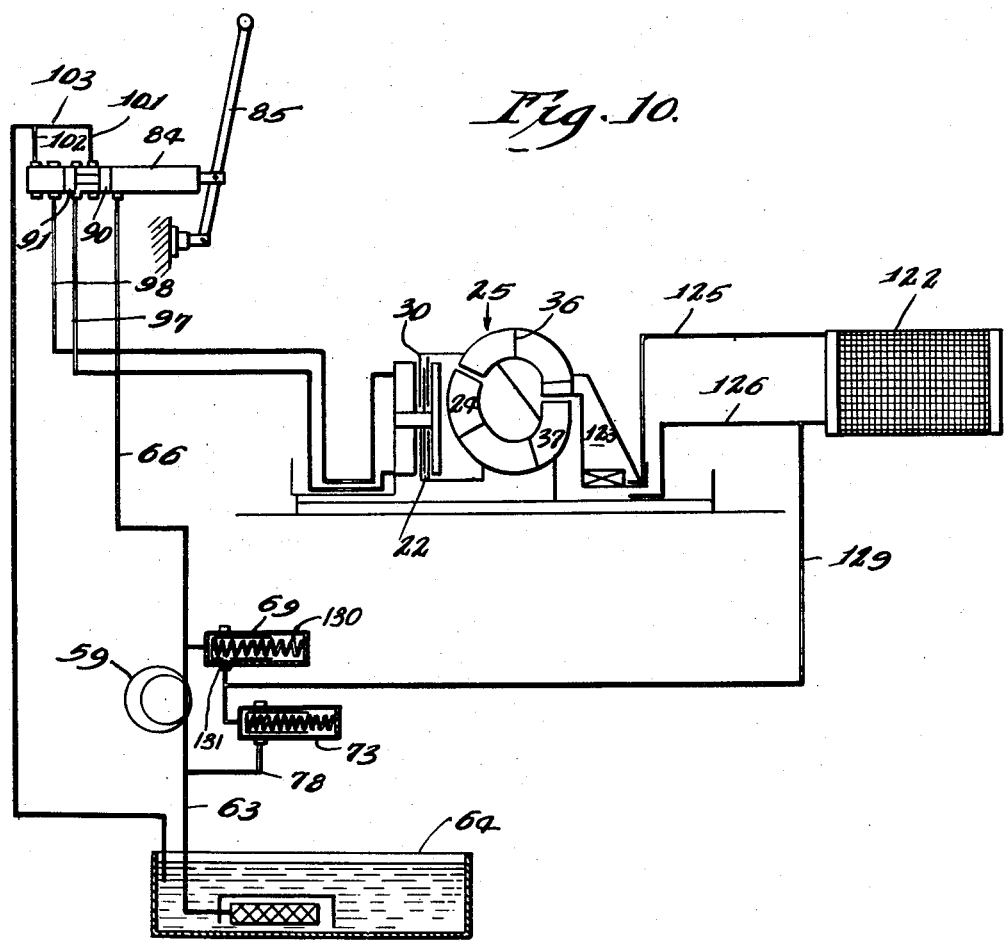

United States Patent Office 2,702,616
Patented Feb. 22, 1955

2,702,616

POWER TRANSMISSION

James B. Black and Wilbur F. Shurts, Rockford, Ill., assignors to Twin Disc Clutch Company, Racine, Wis., a corporation of Wisconsin Application March 15, 1950, Serial No. 149,768

3 Claims. (Cl. 192—3.2)

Our invention relates to power transmissions and more particularly to an arrangement incorporating provision for hydraulically transmitting power to the load during the starting and accelerating period and for direct transmission when the load reaches a desired speed in conjunction with the ability to effect a full power shift from one drive to the other in either direction.

Power transmissions which embody hydraulic and direct drive features with the capacity to shift from one drive to the other are well known and desirable because the high starting torque developed in the hydraulic drive enables heavy loads to be rapidly and smoothly accelerated, while the direct drive provides normal full speed operation at maximum efficiency. However, it is well established that, in characteristic forms of such units, there is a period during the shift from hydraulic to direct drive, or vice versa, when the engine is not connected to the load and hence will accelerate rapidly which is objectionable. For example, in a typical unit wherein a hydraulic torque converter provides the hydraulic drive, the power source is selectively connected to the converter or directly to the driven shaft through friction clutches and in shifting from one drive to another, the unavoidable time required to disengage one clutch and engage the other leaves an interval when the power source is unconnected to the load.

It is therefore one object of our invention to devise a power transmission arranged for selective hydraulic or direct drive in which provision is made for shifting from one drive to the other in either direction without at any instant interrupting full power flow through the unit so that the engine or other power source is at all times coupled to the load.

A further object is to provide a transmission of the character indicated in which the hydraulic drive function is performed by a hydraulic torque converter which during the period of hydraulic drive always operates as a converter and hence may be designed for maximum efficiency for this purpose.

A further object is to provide a transmission as above stated which is equipped with hydraulically actuated clutches whose selective or combined operation determines the conditioning of the unit for hydraulic or direct drive.

A further object is to provide a transmission as indicated in which one pump establishes different pressures in two hydraulic circuits, one including the clutches and the other the converter and a connected cooler.

These and further objects of the invention will be set forth in the following specification, reference being had to the accompanying drawings, and the novel means by which said objects are effectuated will be definitely pointed out in the claims.

In the drawings:

Figs. 3, 4 and 5 are sectional views of the control valve taken along the line 3—3 in Fig. 1 showing, respectively, positions of the valve corresponding to a disengagement of the hydraulic and direct drive clutches, an engagement of the hydraulic drive clutch and a disengagement of the direct drive clutch, and an engagement of both clutches.

Figs. 6 and 7 are enlarged, sectional elevations of the dump valve employed for the outer or direct drive clutch, the former showing the valve in dumping position to permit a disengagement of this clutch and the latter showing the valve shifted by pump pressure to admit the actuating oil to the cylinder of the clutch.

Figs. 8 and 9 are sections along the lines 8—8 and 9—9 in Figs. 7 and 6, respectively.

Fig. 10 is a schematic layout of the hydraulic system, including as one circuit the clutches, the pump and control valve, and as another circuit the hydraulic torque converter and connected cooler, the clutches being disengaged.

Figure 1:
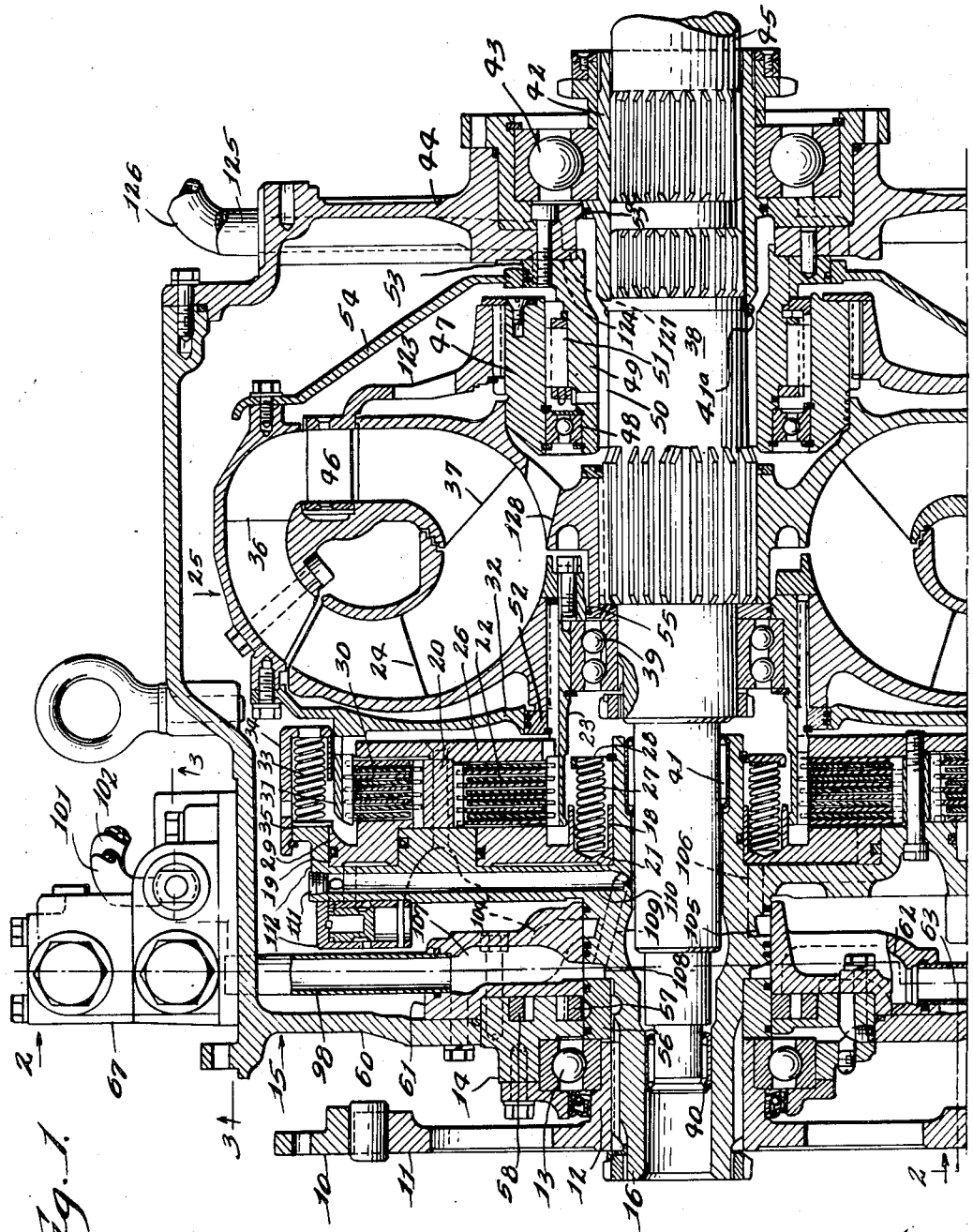
Fig. 1 is a fragmentary, sectional elevation of the transmission as taken along the irregular line 1—1 in Fig. 2, the clutches being shown in disengaged position.

Referring to Fig. 1, the numeral 10 designates a driving ring that may be secured to a flywheel (not shown) or generally any power source and which has toothed, driving connection with a spider ring 11 having a hub 12 which is journaled in a bearing 13 carried by a pump casing 14 that is attached to a housing 15 which encloses the transmission.

The hub 12 has spline connection with the outer end of a sleeve 16 which extends within the housing 15 and has integrally formed therewith or otherwise attached thereto a carrier disk 17 whose right face, as viewed in Fig. 1, is recessed to provide concentric annular cylinders 18 and 19, the former being disposed radially inward of the latter. The disk 17 forms the closed ends of the cylinders and extending from the disk beyond the open ends of and between the cylinders is an externally and internally splined or toothed annulus 20.

An annular piston 21 is slidably mounted in the cylinder 18 in actuating relation to a plurality of clutch plates 22, alternate plates having toothed and sliding engagement with the inner splined surface of the annulus 20 while the intervening plates are similarly engaged with one end of a shell 23 that partially surrounds in spaced relation to and is coaxial with the sleeve 16. The opposite end of the shell 23 is keyed to the pump 24 of a hydraulic torque converter 25. The plates 22 are engaged by the piston 21 against the inner portion of an abutment ring 26 whose central portion is secured to the annulus 20. The piston 21, plates 22 and the inner portion of the ring 26 constitute the hydraulic drive clutch of the transmission and release of the clutch plates, when the actuating pressure is removed, is effected by a plurality of helical springs 27 whose opposite ends respectively abut the piston 21 and an abutment ring 28 carried by the inner end of the sleeve 16.

An annular piston 29 is slidable in the cylinder 19 and is operably related to a plurality of clutch plates 30, alternate plates having toothed and sliding engagement with the outer splined surface of the annulus 20 while the intervening plates have similar engagement with a toothed shell 31 which extends laterally from a connector ring 32 that surrounds the shell 23 between the abutment ring 26 and the converter pump 24. The plates 30 are engaged by the piston 29 against the outer portion of the abutment ring 26 and release of these plates is effected by a plurality of helical springs 33 whose opposite ends respectively abut a cage 34 carried by the disk 17 and a ring 35 carried by and constituting an annular, outward extension of the piston 29. The piston 29, plates 30 and the outer portion of the abutment ring 26 from the direct drive clutch of the transmission.

The outlet and inlet ends of the converter pump 24 are operably related, respectively, to connected turbines 36 and 37 constituting first and second stages of the converter, the turbine 36 being secured to the connector ring 32 and will accordingly be driven thereby when the direct drive clutch is engagged, while the turbine 37 is keyed to a driven shaft 38 which constitutes the output member of the transmission. The shaft 38 is intermediately piloted in a bearing 39 interposed therebetween and the shell 23 and its left end extends within the sleeve 16 and through spaced needle bearings 40 and 41. The opposite end of the shaft 38 extends part way within and is welded at 41ª and splined to a sleeve 42 which is journaled in a bearing 43 carried by the adjacent end wall 44 of the housing 15 and the sleeve 42 is intended to spliningly receive one end of a load shaft 45.

A reaction member 46 is located between the turbines 36 and 37 and functions in the characteristic manner with respect thereto when power is transmitted through the converter. The hub of the member 46 is keyed to a sleeve 47 that is journaled on a bearing 48 carried by the inner end of a cylindrical extension 49 which surrounds and is spaced from the adjacent portions of the shaft 38 and sleeve 42 to provide an annular passage 50 for a purpose presently explained. The opposite end of the extension is attached to the end wall 44. Also interposed between the sleeve 47 and extension 49 is a freewheel or overrunning clutch 51 of usual construction which is arranged to hold the reaction member 46 stationary during power transmission through the converter and to permit it to rotate freely with the pump 24 and turbines 36 and 37 during direct drive. Unauthorized loss of the working liquid from the ends of the converter 25 is prevented by piston ring sealing members 52, 53 and 53ª interposed, respectively, between the sleeve 23 and the inner periphery of the connector ring 32, between the extension 49 and the inner periphery of a cover plate 54 whose outer portion is secured to the turbine 36, and between the sleeve 42 and the inner periphery of the end wall 44 to the left of the bearing 43. Similar loss at the central portion of the converter is prevented by a sealing member 55 which encircles the shaft 38 between the bearing 39 and the hub of the turbine 37 and which sealingly contacts the adjacent end of the sleeve 23.

Figure 2:
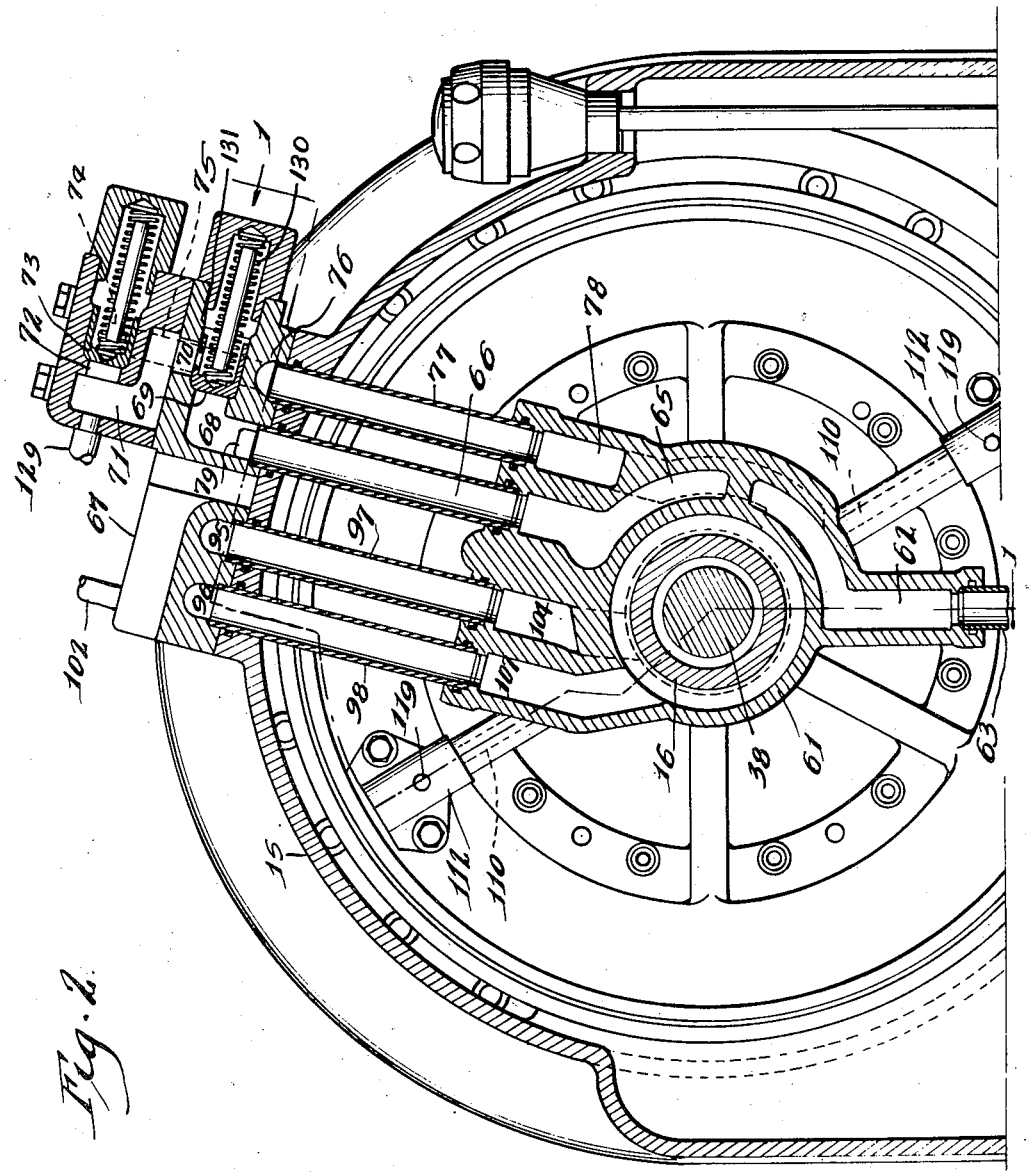
Fig. 2 is a fragmentary section along the line 2—2 in Fig. 1.

Selective hydraulic actuation of the hydraulic and direct drive clutches is accomplished by the following instrumentalities (see Figs. 1, 2 and 10). A spacer ring 56 is keyed to the sleeve 16 in sealing relation to the inner periphery of the pump casing 14 and keyed to the ring 56 within the casing 14 is a pump gear 57 that is eccentrically related in the customary manner to an internal gear 58 also mounted within the casing 14. The casing 14, and gears 57 and 58 form a characteristic internal gear pump generally designated by the numeral 59 in Fig. 10.

Encircling the sleeve 16 and bolted to the inner face of the housing end wall 60 and abutting the inner face of the pump casing 14 so that it partially encloses the pump gears 57 and 58 is a manifold 61 (see Figs. 1 and 2). The underside of the manifold includes a branch 62 which connects at its lower end by way of a pipe 63 with a sump 64 generally provided by the lower part of the transmission housing 15 and at its opposite end with the intake or suction side of the pump 59. The discharge of the pump 59 connects with a manifold branch 65 which in turn communicates with a pipe 66 whose upper end connects with a casing 67 which encloses a pair of pressure regulator valves for determining the pressure of the actuating liquid for the clutches and the pressure of the liquid in the converter circuit, and a control valve for determining the actuation of the clutches.

Specifically, the upper or delivery end of the pipe 66 communicates with the inlet port 68 of a pressure regulating valve 69 whose discharge port 70 connects with a chamber 71 in the casing 67. Preferably, as shown, the valve 69 is shaped as a hollow piston which is biased towards closure by a spring 130 and included in the skirt of the valve 69 is a port 131 which always registers with the port 70. Hence, the total force which tends to close the valve 69 is the sum of the force exerted by the spring 130 and whatever pressure exists in the port 70. The latter chamber communicates with the inlet port 72 of a second spring actuated pressure regulator valve 73 having a discharge port 74 that connects through a passage 75 in the casing 67 with a chamber 76 defined by the abutting relation of the casing and housing 15. The chamber 76 receives oil that has passed through the regulating valves 69 and 73 and this oil is returned through a pipe 77 and a connecting manifold branch 78 to the branch 62 and thence to the suction side of the pump 59 or it may flow directly to the sump 64.

The upper end of the pipe 66 also communicates with a chamber 79 in the lower part of the casing 67 and this chamber connects through a passage 80 (see Fig. 3) with a chamber 81 that always contains oil under pressure while the power source is operating and includes an annular port 82 that surrounds a bore 83 in the casing 67. Slidable in the bore 83 is a valve stem 84 whose right end, as viewed in Figs. 3 and 10, is connected to a pivoted actuating handle 85 whereby the stem may be reciprocated in the bore 83. For the purpose of holding the valve stem 84 in any selected position, it includes annular grooves 86, 87 and 88 spaced axially thereof and arranged to selectively engage a spring actuated detent 89, the grooves respectively determining valve stem positions corresponding to neutral, hydraulic and direct drive conditions of the transmission.

The valve stem 84 includes piston valves 90 and 91 which closely fit the bore 83 and are spaced axially by a reduced neck 92. Annular ports 93 and 94 surround the bore 83 on opposite sides of the port 82 and communicate with chambers 95 and 96 in the casing 67 which in turn connect with the upper ends of pipes 97 and 98, all respectively. Also communicating with the bore 83 and as viewed in Fig. 3 are exhaust ports 99—99 which are located between the port 93 and the neutral position of the piston valve 90, and exhaust ports 100—100 which are located to the left of the port 94. The exhaust ports 99 and 100 connect by pipes 101 and 102, respectively, with a common pipe 103 that returns to the sump 64 (see Fig. 10).

The inner end of the pipe 97 communicates with the outer end of a manifold branch 104 (see Figs. 1 and 2) whose inner end constantly connects with an annular groove 105 provided on the outer surface of the sleeve 16 and which in turn connects through one or more longitudinal passages 106 with the hydraulic drive clutch cylinder 18. The inner end of the pipe 98 connects with the outer end of a manifold branch 107 whose inner end constantly connects with an annular groove 108 provided on the outer surface of the sleeve 16 and this groove connects through one or more passages 109 in the sleeve with the inner ends of a plurality of radial passages 110 provided in the carrier disk 17. As shown in Fig. 2, two passages 110 are employed located in opposed relation and their outer ends are closed by plugs 111.

Oil is supplied through the passages 110 to the direct drive clutch cylinder 19 under the control of a dump valve for each passage generally indicated by the numeral 112 in Figs. 1 and 2 and illustrated in detail in Figs. 6 to 9, inclusive, to which reference will now be made. The valve includes a casing 113 that is secured to the carrier disk 17 adjacent the periphery thereof, being closed at the outer end by a wall 114 and open at its inner end. Slidable in the casing 113 is a piston valve 115, closed and open at its inner and outer ends, respectively, whose movements outwardly are limited by the wall 114 and inwardly by a pin 116 bridged across the bore of the casing. An annular channel 117, provided around the inner end of the valve 115, serves, in the dumping position, shown in Fig. 6, as a means of communication between a passage 118 leading from the direct drive clutch cylinder 19 through the disk 17 and casing 113 and a plurality of exhaust ports 119 in the casing which communicate with the sump 64. Oil is delivered to the cylinder 19 through one end of a passage 120 which connects with the passage 110 adjacent the outer end thereof and which extends through the carrier disk 17 and casing 113 for connection with the outer end of the bore of the casing, the piston valve 115 including an annular groove 121 which communicates with notches 121ª to insure access of the oil to the outer end and interior of the valve. When the pump pressure is effective in the passage 110, it shifts the valve 115 inward to the position shown in Fig. 7, in which the passages 120 and 118 are placed in communication and the valve 115 masks the exhaust ports 119.

The dump valve operates on the principle of pump pressure shifting the piston valve 115 to the position shown in Fig. 7 to thereby engage the direct drive clutch, but when pump pressure to this clutch is interrupted, then, at any speed of the power source, the centrifugal force due to the weight of the piston valve 115 is greater than that due to the weight of the column of oil in the passage 110. Under the latter conditions, therefore, the valve shifts outwardly to the quick dumping position shown in Fig. 6 whereupon the springs 33 release the clutch 30. Due to the smaller radius of the hydraulic drive clutch 22, dump valves are not necessary therefore since the release springs 27 effectively counteract the centrifugal action on the relatively small masses of oil en route to the cylinder for this clutch when the pump pressure is interrupted.

In addition to establishing pressure and promoting circulation in the hydraulic system including the clutches 22 and 30 as above set forth, the pump 59 also establishes a basic operating pressure in a hydraulic circuit including the converter 25 and a connected cooler 122 which will now be described (see Figs. 1 and 10). The circulation in the converter-cooler circuit is effected by the normal pressure available in the converter and is not due to the pump 59.

The converter discharges just interiorly of the cover plate 54 and outwardly of the reaction member 46 into a space 123 which communicates with the inner end of a passage 124 provided in the extension 49 and the end wall 44. The outer end of the passage 124 connects by a pipe 125 with the upper portion of the cooler 122. The return from the cooler is provided by a pipe 126 which connects with the outer end of a passage 127, also in the end wall 44, whose inner end connects through the annular passage 50 and ports 128 in the hub of the turbine 37 with the inner part of the converter circuit. For convenience in illustration, the passages 124 and 127 are shown as lying in the plane of the end wall 44, but spaced from each other.

The basic pressure in the converter-cooler circuit is maintained by connecting one end of a pipe 129 (see Figs. 2 and 10) with the return pipe 126 and the opposite end with the chamber 71 or generally between the discharge port 70 of the regulating valve 69 and the inlet port 72 of the regulating valve 73.

The valves 69 and 73 are of identical size and are set to open at 50 p. s. i., but the manner in which they are coupled together provides a higher pressure in the clutch than in the converter circuit. By reference to Figs. 2 and 10, it will be noted that the valve 73 back pressures the valve 69 so that a pressure of 100 p. s. i. is available in the clutch circuit pipe 66, but only 50 p. s. i. in the pipe 129, i. e., in the converter circuit. In other words, the pump pressure in the chamber 68 must be sufficiently high to overcome the additive pressures of the spring 130 and that in the port 70 as determined by the valve 73.

In describing the operation of the transmission, it will be assumed that the power source is idling, thus driving the pump 59 and the carrier disk 17, and that the valve stem 84 is in the neutral position shown in Fig. 3. The piston valve 91 then masks the annular port 82 so that pump pressure is denied to the outer ends of the pipes 97 and 98 and hence, respectively, to the hydraulic and direct drive clutch cylinders 18 and 19. At the same time, the piston valve 91 also permits communication between the pipe 98 and the exhaust ports 100, while the piston valve 90 uncovers the exhaust ports 99 which are thereby connected with the pipe 97. Accordingly, the piston valve 115 occupies the dumping position shown in Figs. 1 and 6, and the clutches 22 and 30 are disengaged.

In connecting the power source to the load, advantage is taken of the high starting torque and capacity for rapid, smooth acceleration afforded by the converter 25 and to drive through this unit, the valve stem 84 is shifted to the position shown in Fig. 4. The piston valve 91 then uncovers the port 82 but only partially masks the port 94 while still denying pump pressure to the latter port, and the piston valve 90 masks the exhaust ports 99. Therefore, the direct drive clutch 30 remains disengaged, but since the ports 82 and 93 are in communication, pump pressure is transmitted through the pipe and passages described above to the clutch cylinder 18 to thereby engage the hydraulic drive clutch 22.

With the clutch 22 engaged, the power source is connected to the shaft 38 and hence with the load through the torque converter 25, the reaction member 46 being held from rotating in reverse direction by the overrunning clutch 51. When the load is accelerated to the desired speed, the valve stem 84 is further shifted to the position shown in Fig. 5. The piston valves 90 and 91 then deny communication between the exhaust ports 99 and port 93 and between the exhaust ports 100 and the port 94, respectively. At the same time, pump pressure connection to the port 93 is maintained so that the hydraulic drive clutch 22 remains engaged, but pump pressure is also transmitted to the port 94 and through the pipe and passages above described to the cylinder 19 of the direct drive clutch 30 so that this clutch is engaged and the drive is through the turbines 36 and 37 to the shaft 38. During the latter sequence, the dumping piston valve 115 is shifted by the pump pressure to the position shown in Fig. 7 to thereby connect the passage 110 with the cylinder 19 through the passages 120 and 118.

Prior to this direct drive connection, the speed of the shaft 38 is less than that of the power source due to the usual loss through the converter, but when the clutch 30 is engaged, the shaft speed is equalized with that of the power source. Since the hydraulic drive clutch 22 remains engaged, the converter pump 24 and the turbines 36 and 37 rotate at the same or power source speed. Hence, there will not be any reaction against the blades of the reaction member 46 which, as it is released by the overrunning clutch 51, will begin to rotate with the pump and turbines. Since power is not then being transmitted through the converter and all parts thereof are rotating at substantially the same speed, the power losses in the converter circuit are negligible. Actually, the reaction member 46 rotates at a slightly slower speed than the pump and turbines due to the drag of the bearing 48 and the overrunning clutch 51, but the difference is small.

If the load becomes too heavy to be carried in direct drive, the valve stem 84 is shifted to the position shown in Fig. 4, thus interrupting pump pressure to the direct drive clutch 30 and connecting the cylinder thereof to the sump through the dump valve 112, the piston valve 115 of which then occupies the position shown in Fig. 6. Accordingly, the clutch 30 is disengaged, while the hydraulic drive clutch 22 remains engaged.

A particular advantage of the above construction is that the transmission is characterized by a full power shift, the engine at no time being completely disconnected from the load. As load conditions vary, the drive through the transmission may be shifted at will from hydraulic to direct drive and vice versa with the hydraulic drive clutch 22 being always engaged. Power flow through the transmission, regardless of whether the clutch 22 alone is engaged or both clutches are engaged, is interrupted by shifting the valve stem to the position shown in Fig. 3 in which pump pressure to both clutches is cut off and the cylinder of each clutch is connected to the sump.

Another feature of the transmission is that the hydraulic system includes two circuits operating at different pressures which are established by the use of the single pump 59. This pump additionally provides circulation of the oil through that circuit which includes the clutch cylinders, but not through the converter circuit since the pump delivery thereto discharges into the return pipe 126 from the cooler 122 to the converter 25.

We claim:

1. In a power transmission, the combination of a first hydraulic system comprising an hydraulic power circuit means, a cooler and discharge and return lines connecting the circuit means to the cooler, a second hydraulic system including an hydraulically actuated clutch connectible to the power circuit means and adapted for connection to a power source, a pump common to both systems for establishing pressure therein, and means for determining a lower pressure in the first system than in the second system comprising first and second, series connected, pressure regulating valves adjusted to the same pressure and bridged between the discharge and suction sides of the pump, the first valve inlet and the second valve outlet being respectively connected to the discharge and suction sides of the pump connecting means between the outlet of the first valve and the inlet of the second valve including means for applying the pressure established by the second valve against and in a direction tending to close the first valve, and a pipe communicating the return line in the first system to the connecting means between the valves.

2. In a power transmission, the combination of a first hydraulic system comprising an hydraulic power circuit means, a cooler and discharge and return lines connecting the circuit means to the cooler, a second hydraulic system including an hydraulically actuated clutch connectible to the power circuit means and adapted for connection to a power source, a pump common to both systems for establishing pressure therein, and means for determining a lower pressure in the first system than in the second system comprising first and second, series connected, pressure regulating valves bridged between the discharge and suction sides of the pump, the first valve inlet and the second valve outlet being respectively connected to the discharge and suction sides of the pump connecting means between the outlet of the first valve and the inlet of the second valve including means for applying the pressure established by the second valve against and in a direction tending to close the first valve, and a pipe communicating the return line in the first system to the connecting means between the valves.

3. In a power transmission, the combination of a first hydraulic system comprising an hydraulic power circuit means, a cooler and discharge and return lines connecting the circuit means to the cooler, a second hydraulic system including an hydraulically actuated clutch connectible to the power circuit means and adapted for connection to a power source, a pump common to both systems for establishing pressure therein, and means for determining a lower pressure in the first system than in the second system comprising first and second, series connected, pressure regulating valves bridged between the discharge and suction sides of the pump, the second valve being adjusted to a pressure not higher than that of the first valve, the first valve inlet and the second valve outlet being respectively connected to the discharge and suction sides of the pump connecting means between the outlet of the first valve and the inlet of the second valve including means for applying the pressure established by the second valve against and in a direction tending to close the first valve, and a pipe communicating the return line in the first system to the connecting means between the valves.

References Cited in the file of this patent

UNITED STATES PATENTS

| | | |
|---|---|---|
| 2,351,483 | Carnagua | June 13, 1944 |
| 2,369,369 | Peterson et al. | Feb. 13, 1945 |
| 2,440,589 | Kegresse | Apr. 27, 1948 |
| 2,449,608 | Le May | Sept. 21, 1948 |
| 2,461,218 | Lapsley | Feb. 8, 1949 |
| 2,464,538 | Vanderzel | Mar. 15, 1949 |
| 2,544,551 | Black | Mar. 6, 1951 |
| 2,607,456 | Jandasek | Aug. 19, 1952 |

FOREIGN PATENTS

| | | |
|---|---|---|
| 643,678 | Germany | Apr. 14, 1937 |